Aug. 26, 1947.  F. M. TOMPKINS  2,426,533
CATHODE RAY STEAM GENERATOR
Filed April 5, 1945   2 Sheets-Sheet 1

INVENTOR.
FRANCIS M. TOMPKINS

BY *Victor J. Evans & Co.*

ATTORNEYS

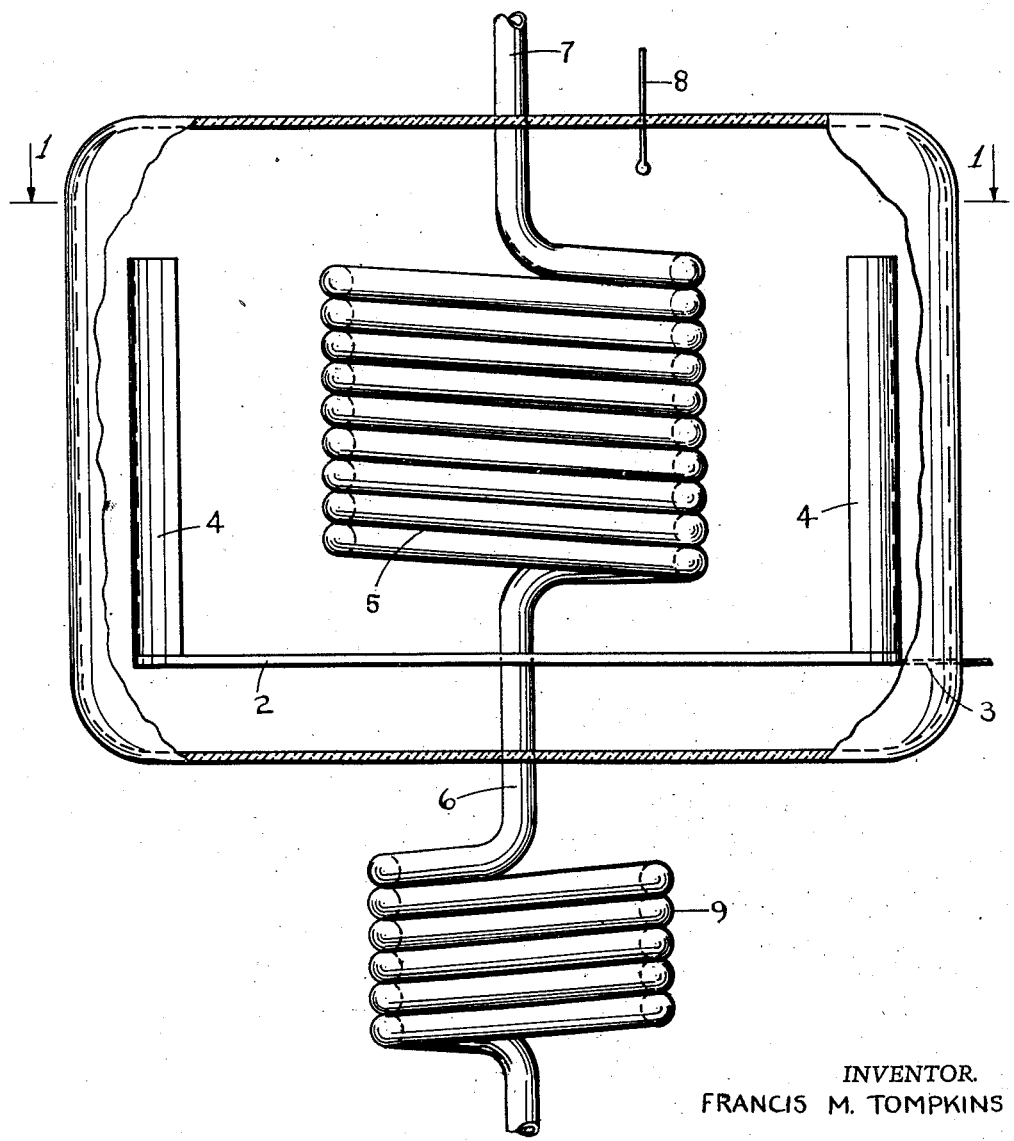

Patented Aug. 26, 1947

2,426,533

UNITED STATES PATENT OFFICE 2,426,533

CATHODE-RAY STEAM GENERATOR

Francis M. Tompkins, St. Paul, Minn.

Application April 5, 1945, Serial No. 586,783

3 Claims. (Cl. 219—39)

My present invention, in its broad aspect, has to do with improvements in steam generators which may be used to produce heat in radiators for house heating, or to operate sterilizers, to heat hot water, to operate power units, and for various other purposes where steam may be used, and my heating element consists in cathode rays directed upon heating coils through which the water passes to form the steam. Any number of cathodes may be used depending upon the size of the unit and the temperatures required and the cathodes, as well as the heating coils, are contained in a casing having a substantial vacuum and into which the electric connections lead as well as the water inlet and steam exhaust pipes. My cathodes are concave in shape and are so arranged that the rays emanating therefrom are focused on the heating coils.

Other, and equally important objects and advantages of my invention will be apparent from the following description and drawings, and it is understood that changes are permissible in the form, size, shape, materials and construction and arrangement of parts and are within the purview of my broad inventive concept and the scope of the appended claims.

In the drawings wherein I have illustrated a preferred form of my invention:

Figure 2 is a vertical elevation partly broken away.

In the drawings wherein like characters of reference are used to designate like or similar parts:

Figure 1:
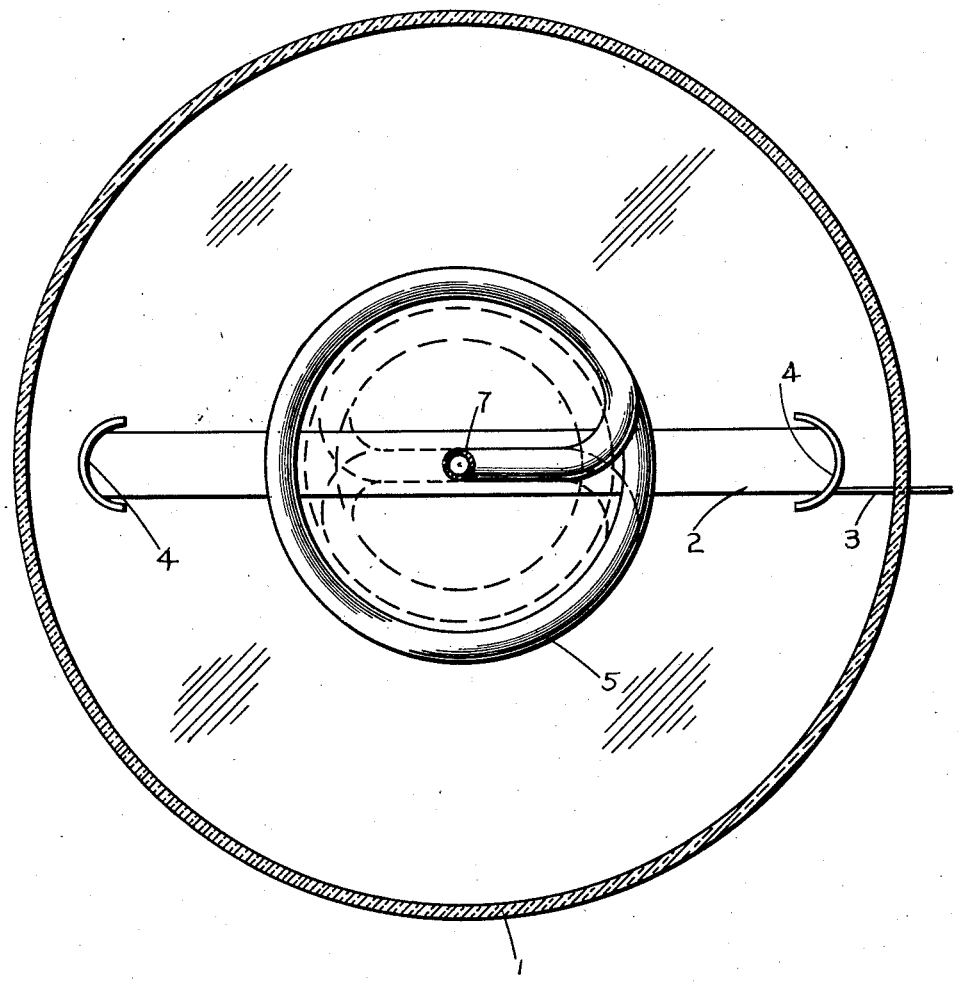
Figure 1 is a transverse section on the line 1—1 of Figure 2.

The numeral 1 designates a glass globe or casing of suitable size and shape, within which are mounted on a support 2 having negative electrical connections 3 the concave or semi-circular cathodes 4; these being arranged so that the focal points of the rays are directed against a heating coil unit 5 having a water inlet 6 and a steam outlet 7, and a positive electrical connection 8, all of which are sealed since the globe or casing is pumped out or exhausted of air to be a substantial vacuum. Below the casing and in the water inlet pipe 6 is a pre-heater coil 9 which may or may not be used depending on the wishes of the user and the requirements of practical service. Any number of cathodes may be used depending on the size of the unit and the amount of heat required. In practice, it is found that the heating coil should preferably be made of a metal which will withstand high temperatures and not volatilize, such for instance, as tungsten. The pre-heater is desirable when water is introduced directly from a supply tank. The device operates on direct current and is simple, practical, and efficient in operation.

From the foregoing, it is believed that the operation and advantages of my invention will be apparent, but it is again pointed out that interpretation of the scope of my invention should only be conclusive when made in the light of the subjoined claims.

I claim:

1. A cathode ray water heater, comprising a glass container having a substantial vacuum, a plate mounted in said container transversely thereof, an electrical connection at one end of said plate, a plurality of vertically disposed, relatively spaced and diametrically opposed cathodes having curved cross sections to focus rays on a predetermined point, electric connections leading into the container, and a water and steam coil in the container having an inlet and an outlet, a preheater coil without the container within the inlet pipe, the water and steam coil being between the cathode units at the focal point of the cathode rays.

2. The invention as defined in claim 1 wherein the cathodes are arcuate in cross-section.

3. The invention as defined in claim 1 wherein the cathodes are semicircular in cross section.

FRANCIS M. TOMPKINS.

REFERENCES CITED

The following references are of record in the file of this patent:

UNITED STATES PATENTS

| Number | Name | Date |
|---|---|---|
| 1,561,276 | Pankratz | Nov. 10, 1925 |
| 1,926,958 | Peterson | Sept. 12, 1933 |
| 2,145,104 | Wright | Jan. 24, 1939 |
| 2,046,233 | Audain | June 30, 1936 |
| 1,326,794 | Sinding-Larsen | Dec. 30, 1919 |
| 848,600 | Pirani | Mar. 26, 1907 |
| 2,140,348 | Clark | Dec. 13, 1938 |